(12) United States Patent
Nutt et al.

(10) Patent No.: US 6,864,297 B2
(45) Date of Patent: Mar. 8, 2005

(54) COMPOSITE FOAM MADE FROM POLYMER MICROSPHERES REINFORCED WITH LONG FIBERS

(75) Inventors: Steven R. Nutt, Irvine, CA (US); Lev Vaikhanski, Encino, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/624,922

(22) Filed: Jul. 21, 2003

(65) Prior Publication Data

US 2004/0059010 A1 Mar. 25, 2004

Related U.S. Application Data

(60) Provisional application No. 60/398,142, filed on Jul. 22, 2002.

(51) Int. Cl.[7] ............................ C08J 9/232; C08J 9/236; C08J 9/24
(52) U.S. Cl. ............................................ 521/54; 521/55
(58) Field of Search ................... 521/54, 55; 523/218, 523/219; 106/122

(56) References Cited

U.S. PATENT DOCUMENTS

| | | | |
|---|---|---|---|
| 3,673,130 A | | 6/1972 | Papa et al. |
| 3,740,356 A | | 6/1973 | Munoa et al. |
| 4,067,829 A | | 1/1978 | Garrett |
| 4,163,824 A | | 8/1979 | Saidla |
| 4,365,024 A | | 12/1982 | Frentzel |
| 4,418,159 A | | 11/1983 | Rasshofer et al. |
| 4,680,214 A | | 7/1987 | Frisch et al. |
| 4,855,170 A | * | 8/1989 | Darvell et al. ............. 428/40.2 |
| 4,879,163 A | * | 11/1989 | Woiceshyn .................. 428/198 |
| 4,923,902 A | * | 5/1990 | Wycech ........................ 521/54 |
| 4,995,545 A | * | 2/1991 | Wycech ....................... 228/119 |
| 5,137,831 A | | 8/1992 | Gruteser |
| 5,137,931 A | | 8/1992 | Okumura et al. |
| 6,013,689 A | | 1/2000 | Rader |
| 6,342,750 B1 | | 1/2002 | Braungardt et al. |

FOREIGN PATENT DOCUMENTS

| | | |
|---|---|---|
| JP | 03-086506 | 4/1991 |
| JP | 05-286069 | 11/1993 |
| JP | 05-318506 | 12/1993 |
| JP | 2000-119424 | 4/2000 |
| JP | 2001-011230 | 1/2001 |

OTHER PUBLICATIONS

Kiyotake Morimoto et al., "Adhesion Between Glass–Fiber and Matrix of Glass–Fiber Reinforced Rigid Polyurethane Foam Under Tension", 1994, *Polymer–Plastics Technology and Engineering*, 22(1), 55–76.

C. S. Karthikeyan et al., "Influence of Chopped Strand Fibres on the Flexural Behavior of a Syntactic Foam Core System", 2000, *Polymer International* 49: 158–162.

* cited by examiner

*Primary Examiner*—Morton Foelak
(74) *Attorney, Agent, or Firm*—Fish & RIchardson P.C.

(57) ABSTRACT

Composite foam based on expandable microspheres reinforced with fibers is described. Also disclosed are methods of making microsphere foam reinforced with fibers and methods of use thereof. The disclosure provides foam that performs equally and better than the performance of most thermoplastic foams commercially available.

29 Claims, 13 Drawing Sheets

A

B

Triple Junctions of the cell walls

A        B

COMPOSITE FOAM MADE FROM POLYMER MICROSPHERES REINFORCED WITH LONG FIBERS

CROSS-REFERENCE TO RELATED APPLICATIONS

The present application claims priority under 35 U.S.C. §119 to U.S. Provisional Application Ser. No. 60/398,142, filed Jul. 22, 2002, the disclosure of which is incorporated herein by reference.

TECHNICAL FIELD

This invention relates to foam, and more particularly to fiber-reinforced foams.

BACKGROUND

The properties of rigid polymer foams are important for the design and performance of sandwich structures that are used in a wide range of engineering applications, including airframes, transportation vehicles, boat hulls, radar systems, surf boards, and space structures (DIAB Inc. Technical Information for Divinycell® Foam, 2002; Rohm A G. Technical Information for Rohacell® Foam, 2002; Baltek Corp. Technical Information, 2002; Marsh J. Fire-Safe Composites for Mass Transit Vehicles. Reinforced Plastics, 46(9):26–30, 2002). Currently, most high-performance structural foams are fabricated by expanding (blowing) liquid polymers to form rigid, low-density foams. Some of the leading thermoplastic foams made in this way are polymethacrylimide (PMI) and partly cross-linked polyvinyl chloride (PVC), with trade names Rohacell® and Divinycell®.

Syntactic foams are composites consisting of hollow microspheres (minute hollow bubbles, microbubbles, or microballoons) that are dispersed in a resinous matrix, or binder. These microspheres are commonly made from inorganic materials such as glass and silica; and polymeric materials such as epoxy resin, unsaturated polyester resin, silicone resin, phenolics, polyvinyl alcohol, polyvinyl chloride, polypropylene, and polystyrene. One example of syntactic foam known in the art to be used as structural foam is sold by Novamax industries under the tradename "Novacore". This product uses an epoxy as the continuous resinous matrix or binder phase.

In these syntactic foams, the resinous matrix is typically substantially non-cellular. However, because the microspheres are hollow, their inclusion reduces the density of the syntactic foam. Thus, essentially all of the reduction in density (relative to that of the unfoamed epoxy matrix) is attributable to the gas contained in the microspheres. In some instances the epoxy matrix is expanded slightly by incorporating into it expandable plastic spheres and/or thermally decomposable blowing agents such as azodicarbonamide or p,p-oxybis(benzene sulphonyl hydrazide).

Although one- and two-part epoxy-based syntactic foams have enjoyed some success as reinforcing foam in the auto industry, they suffer from some deficiencies. For example, epoxy-based syntactic foams are generally very brittle and thus lack fracture toughness. Therefore, these foams tend to shatter on impact (such as in a vehicle collision) or crack easily under stress.

SUMMARY

The invention provides a foam composition comprising a fibrous material and microspheres. In one aspect of the invention, the microspheres are expandable and lack a binding phase.

The invention also provides a composition comprising a microsphere component comprising a microsphere selected from the group consisting of a glass, a silica-alumina ceramic, an epoxy resin, an unsaturated polyester resin, a silicone resin, a phenolic, a polyvinyl alcohol, a polyvinyl chloride, a polypropylene, a polystyrene, a polyacrylonitrile, a polyimide and any combination thereof; and a fibrous component.In one aspect of the invention, the fibrous component comprises polyester fibers, aramid fibers, glass fibers, carbon fibers or a combination thereof, configured in random, woven or otherwise ordered to consitute a fiber "preform."

The invention also provides a fibrous-reinforced foam made by a method of the invention. The method includes contacting a fibrous material with a microsphere component under conditions such that the microsphere component infiltrates the fibers of the fibrous component to generate a mixture; and then heating the mixture under conditions such that the microspheres expand and fuse to the fibers and to adjoining microspheres in the absence of a resinous binder phase.

The invention further includes a method of making a fibrous-reinforced foam. The method includes mixing a microsphere component with a fiber component in a closed mold; vibrating the closed mold under conditions that cause the microspheres to infiltrate the fiber component or preform; heating the mold to expand the microspheres and fuse them together; and allowing the mixture to cool.

The invention provides a composite foam comprising expandable microspheres reinforced with fibers. In one aspect of the invention, the composite foam of the invention is fabricated by infiltrating low-density fiber with microspheres. The combination is then heated to expand the foam. The resulting composite foam comprises about 10 wt % fibers (e.g., aramid fibers) and has a density of about 100 kg/m$^3$. Mechanical properties, crack propagation, and microstructure of the composite foam is described herein and demonstrates that the composite foam performance equaled or surpassed the performance of most thermoplastic foams commercially available. The tensile strength and modulus of the composite foam increased by factors of about 6 and 8, respectively, and the shear strength and modulus increased by factors of about 1.8 and 2.4. The composite foam also exhibited improved strain energy density and damage tolerance, and reduced notch sensitivity.

The invention also provides a method for preparing composite foam using expandable PAN-based microspheres reinforced with high-performance fibers. In this aspect of the invention composite foams are produced by mixing expanded and non-expanded microspheres in select proportions, packing the dry microspheres into a fibrous preform in a closed mold, and heating the assembly to expand and weld the microspheres and fibers together.

The composite foams compositions of the invention and the composite foams produced by the methods of the invention exhibit mechanical performance and formability that surpassed the unreinforced foams.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
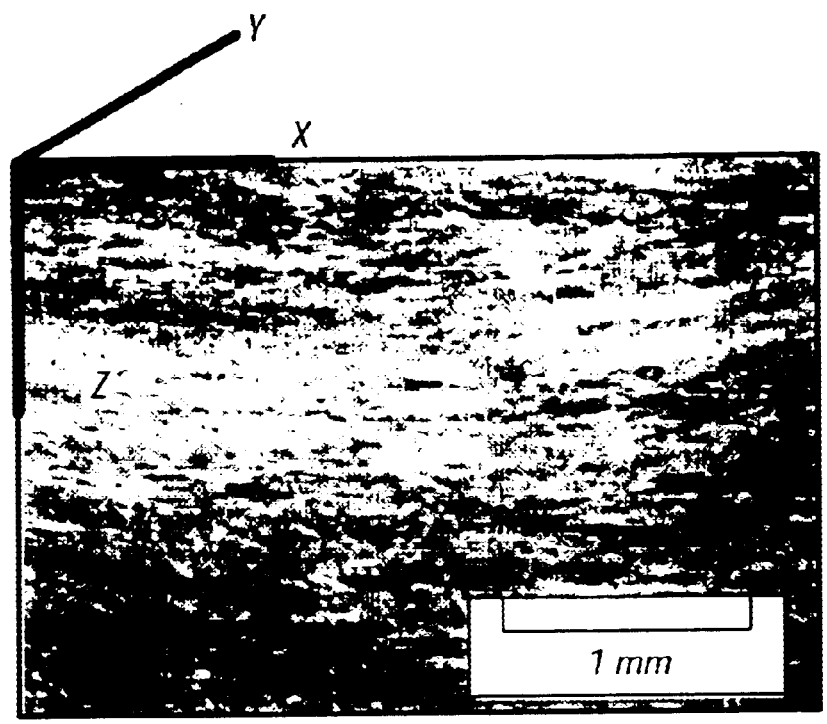
FIGS. 1A-B shows the configuration of Kevlar 29 unidirectional webbing material. (A) Side view of webbing sheet (Z-X plane). (B) Top view of web sheet (Y-X plane, where X is the direction of carding machine and conveyor belt).
Figure 1:
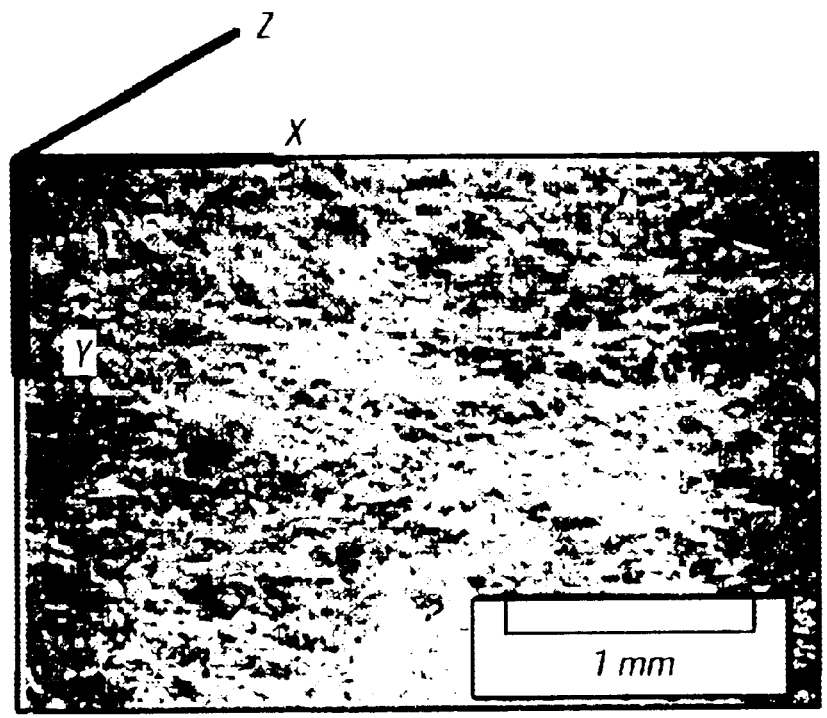

To overcome problems with existing foam, foam composites, and the like, the invention provides methods and compositions associated with fiber-reinforced composite foam. Generally, the invention provides methods and compositions whereby microspheres (e.g., dry microspheres) are combined with fiber preforms (e.g., fiber webbing) to produce a composite foam.

The invention provides a composite foam comprising expandable microspheres reinforced with fibers. In one aspect of the invention, the composite foam of the invention is fabricated by infiltrating a low-density, permeable network of fibers (preform) with microspheres. In some embodiments, long continuous fibers are used. In other aspect, shorter, chopped fibers may be used. The combination is then heated to expand the foam. The resulting composite foam comprises about 10 wt % fibers (e.g., aramid fibers) and had a density of about 100 kg/m$^3$. Mechanical properties, crack propagation, and microstructure of the composite foam is described herein and demonstrates that the composite foam performance equaled or surpassed the performance of most thermoplastic foams commercially available. The tensile strength and modulus of the composite foam increased by factors of about 6 and 8, respectively, and the shear strength and modulus increased by factors of about 1.8 and 2.4. The composite foam also exhibited improved strain energy density and damage tolerance, and reduced notch sensitivity. The composite foam compositions of the invention and the composite foams produced by the methods of the invention exhibit mechanical performance and formability that surpassed that of unreinforced foams. The tensile modulus and strength were increased by about 750 and about 400% respectively, and showed enhanced resistance to crack propagation compared with unreinforced foam samples. In another aspect of the invention fiber performs were comprised of 3D, stochastically arranged long fibers, and typical fiber loadings were about 8 wt. %. Long fibers were deeply anchored in the foam and bridged crack wakes, resisting crack growth and delaying catastrophic failure of the foams during tensile tests.

The invention provides methods for preparing long fiber reinforced thermoplastic foams based on vibratory infiltration and packing of dry, hollow thermoplastic microspheres into low-density fiber preforms, followed by expansion and welding of the bubbles under heat and pressure. The methods of the invention eliminate the problems associated with the viscous flow of liquid, and eliminates the need for a separate binder phase.

In one specific aspect, the composite foam is synthesized from thermoplastic expandable pPolyvinyl chloride (PVC) microspheres reinforced with long aramid fibers. In another aspect, polyacrylonitrile (PAN) microspheres are combined with aramid fibers.

PVC foam is a successful engineering material widely used as a core material for sandwich structures in transportation vehicles, wind energy structures, building construction, and marine applications. Basic mechanical properties, including tensile, shear, flexure, and compression, were measured for composite foams of the invention and compared with similar properties measured for two unreinforced PVC foams, including a commercial foam and a foam made from expandable microspheres. The microstructure and crack propagation behavior were also investigated, as well as the effects of fiber concentration, arrangement and quality of the fiber network bonding.

Investigation of the basic mechanical properties of fiber-reinforced composite foam of the invention (e.g., PVC composite foam) showed vast improvements in tensile, shear, and flexural strength when compared with unreinforced PVC foam made from similar microspheres. When compared with commercial unreinforced PVC foam that was partially cross-linked, the composite foams of the invention surpassed the commercial foam in most measures of performance. Particularly noteworthy was the superior strain energy density of the composite foams of the invention, which should translate into superior damage tolerance and impact resistance. These qualities are highly valued in sandwich core materials, and they derive from the superior strength and modulus of the reinforcing fibers. What is somewhat remarkable is the magnitude of performance enhancement associated with relatively low fiber loadings. This gives cause to speculate that the approach of fiber reinforcement may lead to similar gains in other foam systems, while retaining the low-cost attribute associated with most foam materials.

Mircrospheres (e.g, hollow microballoons or microbubbles) find prevalent use in industry, most commonly as additives or fillers. A benefit of microspheres over fillers (e.g., silicates, aluminates, clays, talcs, and the like) is that the hollow feature of the microsphere results in weight reduction. Microspheres offer a means of introducing controlled, small voids in a closed-cell configuration. This can be difficult to obtain in both viscous and non-viscous fluids, resins, coatings, and cements using conventional foaming agents due to problems associated with the foaming process such as unequal cell growth, time- and temperature-dependent gas diffusion, cell coalescence, and the like. Thus, microspheres provide a means for uniformly and homogeneously increasing product bulk while simultaneously decreasing the overall density, lowering product cost on a volumetric basis without sacrificing (or while enhancing) performance.

In addition to the benefits of weight reduction and cheaper product cost, microspheres offer many other advantages in a wide variety of products. For example, an overall increased volume load capacity leading to a higher loading capacities in turn lead to dimensional stability, improved applicability, and further overall weight reduction or density reduction.

The "microspheres" of the invention are particles of thermoplastic resin material. In some aspect the microsphere may have incorporated therein a chemical or physical blowing agent, and which may be expanded upon heating. The microspheres of the invention can have any desired diameter. For example, they may have an average diameter of from about 5 to about 150 $\mu$m (e.g., from about 20 to about 85 microns; about 6 to about 45 $\mu$m) Typically the average diameter is about 10 to about 16 $\mu$m, in an unexpanded state, and a diameter of about 15 to about 90 $\mu$m, typically about 40 to about 60 $\mu$m in an expanded state. The microspheres may be used in either an expanded or unexpanded state, or blends of both. Any suitable thermoplastic resin material may be used to make up the microspheres. Suitable thermoplastic resin materials include, for example, polystyrene, styrene copolymers, acrylonitrile, polyvinyl chloride, vinyl chloride copolymers, vinylidene chloride copolymers, polyimide polymers, and the like. The thermoplastic synthetic resin material is typically solid at room temperature.

Suitable microspheres may also include those made from inorganic materials such as glass and silica-alumina ceramics or polymeric materials such as epoxy resin, unsaturated polyester resin, silicone resin, phenolics, polyvinyl alcohol, polyvinyl chloride, polypropylene, and polystyrene. In addition, fly ash that is in the form of hollow particles can be used. Examples of commercially available fly ash of this type is sold by Boliden Intertrade, Inc., under the trade names Fillite 100 and Fillite 150. The microspheres advantageously have a burst pressure sufficient to withstand the forces imposed upon them during the formulation, mixing and dispensing processes. Microspheres having an 80% or greater survival rate when exposed to at least 750 psi are preferred, and those having an 80% or greater survival rate when exposed up to 5500 psi are more preferred. In addition, the microspheres have a low bulk density of from about 0.1 to about 0.5 g/cc.

The microspheres may include a chemical or physical blowing agent within the sphere that permits them to be expanded upon heating. Any suitable blowing agent may be used provided that it causes the microspheres to expand upon heating. For example, suitable blowing agents may include azodicarbonamide, isobutane, pentane, isopentane, $CO_2$, and/or freon. If desired, the microspheres may be surface treated with an interfacial adhesion promoter such as a silane compound.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature. In one aspect of the invention an expandable microsphere does not include a binding agent (e.g., a binder phase) found in most syntactic foam preparations. For example, a binderless expandable microsphere includes microspheres that are capable of increasing in size upon heating due to the formation of one or more gaseous voids or bubbles in the interior of the particle to give a microbubble or microballoon. Typically such microspheres comprise a hollow particle defined by having a polymeric shell wall surrounding one or more internal, gaseous voids. The lack of a binder agent reduces costs, simplifies processing, increases efficiency, and avoids the use of noxious chemical agents. Of particular importance is that binderless expandable microspheres are capable of fusing to one another, to fibrous material in a composite mixture, or a combination of both. The term "fusible", as used herein and in the appended claims, means able to fuse together into a connected foamed or foamable mass comprising a fibrous material.

Expandable microspheres (which can comprise, for example, volatile physical blowing agents such as hydrocarbons or halocarbons encapsulated in thermoplastic shells) can be used in the methods and compositions of the invention. Expandable microspheres are available from Akzo Nobel AB under the trademark EXPANCEL. The amount and type of expandable microsphere utilized may each be readily varied to obtain the desired degree of expansion (typically, from about 5% to about 150%, more typically from about 35% to about 70%).

Some microsphere types require binding phases. For example, syntactic foams require a binder phase in order to promote adhesion between microspheres. For example, a rigid binder is typically added to support and reinforce glass microspheres, giving greater strength for a given density. However, excessive rigidity may result in cracking, particularly under thermal shock and cycling. In addition, binders contribute to increased foam density. The most common rigid binder resin choice is epoxy, because of its superior strength and resistance to hot, wet conditions. The choice of hardener may be either anhydride or amine curing agents, each of which has distinct advantages and disadvantages. Flexible Binders are sometimes used to avoid cracking. However, flexible binders must be carefully designed to avoid degradation under hot, wet conditions. Polyurethane, for example, may show reversion or hydrolysis, and rubbers often suffer from oxidation. Another problem is that flexible binders do not reinforce microsphere fillers, detracting from their effectiveness in density and thermal conductivity.

Production methods and compositions for microspheres made from various glass, metallic, or polymeric materials have been disclosed, patented, or used in the past, e.g. see U.S. Pat. Nos. 3,615,972, 3,838,998, 3,888,957, 3,933,955, 3,945,956, 4,049,604, 4,075,134, 4,133,854, 4,257,798, 4,303,603, 4,349,456, 4,661,137, 4,767,726, 4,782,097, 4,983,550, 5,069,702, 5,053,436, 5,077,241, and 5,225,123.

A number of fiber-types can be used in the methods and compositions of the invention. Such fibers include, but are not limited to, carbon, glass, aramid (e.g., Kevlar® and Twaron®), polyethylene (e.g., Spectra® and Dyneema®), polyparaphenylene benzobisoxazole (e.g., Zylon®), polybenzamidazole (PBI), and hybrids thereof as well as other polymer fibers. Some flexible fibers, particularly aramid fibers such as Kevlar® or Nomex® (trade names for aramid fibers produced by DuPont), have a well-known affinity for phenolics. The invention demonstrates that these materials and similar materials provide an effective material for reinforcing foams. Furthermore, from the viewpoint of flame resistance, such aramid fibers are highly desirable. The invention provides foams that comprise flexible fibrous materials (e.g., aramid fibers). The presence of the flexible fibrous material increases the toughness of the composite foam.

Short or long fibers of any type, but typically glass and Nomex® can be used. Discrete filaments of one specific fiber-type or mixtures of different fibers can be used. The fibers can be chopped to a desired length with any type of cutting method (e.g., between about 0.5 mm to 30 mm, typically about 1.5 mm (0.0625 inch) to about 6.4 mm (0.25 inch)). Glass fibers free of any sizing or with phenolic compatible sizing can be used, while Nomex fibers are typically sheer and clean.

The amount of fibers in the composite foam can be varied. Consideration of such factors as the fiber length being chosen, the desired extent of enhanced foam properties, the ease of processing, the production cost, and like, are taken into account in determining the amount of fiber to be used. Typically, fiber loading should be no less than 3 wt. %, typically above 5 wt. %, in order to achieve a desirable level of enhancement of foam properties.

Fiber concentration had a non-linear effect on composite foam strength. The addition of 4 wt % fibers caused a five-fold increase in tensile strength, while the addition of 10 wt % fibers caused an additional increment of only 20%. This observation can be explained in terms of the nature of the type of microspheres and the fiber webbing pre-forms. For example, PVC microspheres have a minimum diameter ~10 μm in the original unexpanded condition, and 40 μm in the expanded condition. As the fiber content is increased, the preform becomes less permeable, particularly in localized regions. This can prevent complete infiltration by the microspheres (despite mechanical vibration), resulting in local regions of poor fiber-foam and inter-sphere adhesion. Thus, two competing tendencies are observed with high fiber loadings. First, there is an increase in strength proportional to the fiber loading. Secondly, there is a nonlinear increase in defect density as the density of fiber crossovers increases in the fiber preform, causing sharp decreases in local permeability.

These competing tendencies have been analyzed qualitatively, and such analysis helps explain why a 250% increase in fiber content (from 4 to 10%) produces a strength increment of only 20%. Note, however, that the energy density calculated from the area under the stress—strain curve displays a quite different dependence. The energy dissipated by the composite foam during fracture increases in proportion to the increase in fiber content. The proportion of broken fibers is the same at low and high fiber loading, and their contribution to energy dissipation thus increases with fiber loading.

The synthesis method of the invention is also unique. Unlike conventional foam synthesis techniques, which rely on blowing agents that evolve gas while the resin is in a liquid state, the microspheres are expanded in the "dry" state. As a result, the fibers and microspheres can be blended dry, eliminating the severe rheological problems associated with mixing fibers in a liquid resin and subsequently expanding the foam. Furthermore, the "dry" expansion of microsphere foam is well-suited to the use of continuous fiber reinforcement, as demonstrated herein. Thus, the considerable performance enhancing potential of fiber strengthening can be efficiently exploited. Finally, some microsphere foams are based on thermoplastic polymers, and thus may offer certain manufacturing benefits. Once preforms are infiltrated with microspheres, composite foams can be "expanded in place," e.g., within a composite shell. The expanded composite foam is also thermoformable, permitting forming operations necessary to produce curved parts.

The invention also provides methods of making the composite foams described herein. For example, the process for fabricating fiber-reinforced foam uses vibratory infiltration of dry microspheres into a fiber preform. The infiltrated fiber preform is then heated in a closed mold to expand the microspheres and fuse them together. A closed mold includes any device that allows for the expansion of a foam while maintaining a desired volume. Fibers of a desired length can be treated as desired to make the fibers more susceptible to interaction with the microsphere used in the foam. For example, aramid and glass fiber preforms can be surface-treated to improve chemical adhesion to the microspheres. In one aspect, the fibers are treated with an epoxy in acetone. For example, aramid and glass fibers are treated in a dilute solution of epoxy in acetone. In this aspect, commercial grade epoxy resin 2000 and hardener 2120 (Fibre Glast Corp.) is mixed in a 3:1 weight ratio, and added to the acetone. Where the fibers are treated prior to use (e.g., such as with epoxy-acetone), the fibers should be dried. Once dried the fibers are placed in the desired mold to completely fill the volume of the mold. Microspheres (of the desired type and blend) are added to the fiber containing mold. For example, a blended mixture of expanded and unexpanded PAN microspheres (weight ratio of 7:1; other ratios can be used) are poured over the fiber preform.

The mold containing the fibers and microspheres should be treated in a manner that promotes the infiltration of the microspheres into the fibers. Vibration of the mold containing the fibers and microspheres can be used. For example, a sonic actuator can be used to mechanically vibrate the mold. The time period for vibration can be varied depending upon the type of fiber, fiber density, microsphere, and microsphere size used. Other factors will be apparent to those of skill in the art in determining the vibratory force and time period for treating the mold. The vibration should be sufficient to cause the microspheres to infiltrate the fiber preform.

In one aspect of the invention, the fiber volume loading in the mold is about 3, about 0.3, and about 0.6% for polyester, glass, and aramid fibers, respectively. The microspheres are loaded into the mold with the fibers under conditions (e.g., vibratory conditions) such that the microspheres infiltrate and occupy the interstitial volumes between fibers. The mold is then closed and heated for a under conditions (e.g., time and temperature) to expand the microspheres.

The methods of the invention are a new approach for producing structural foam reinforced by long fibers. The approach termed herein as "vibration fluidization", was used to pack dry microspheres into random 3D fiber preforms to ensure adequate consolidation with minimum voids. The methods of the invention do not suffer from the inherent processing difficulties associated with composite foams or syntactic foams, because the blowing agent is pre-encapsulated in solid microspheres, and the fibers are not infiltrated with a liquid resin. The method of the invention is flexible and adaptable to a variety of fiber types and preform architectures. In principle, any 2D or 3D fiber preform in woven or non-woven form with sufficient permeability can be used.

The vibration fluidization methods of the invention prevent excessive displacement of fibers and microspheres during foam expansion. For example, long-fiber wool comprises a high-density of entangled crossovers between fibers that are minimally displaced during foam expansion and deformation. At the same time, the combination of unexpanded microspheres with pre-expanded microspheres restricts the local motion of microspheres during heating. The pre-expanded microspheres serve to fill interstitial spaces, while the unexpanded microspheres expand during heating, impinging on microspheres in close proximity and welding them together. This method is well suited to production of composite foam articles with complex shapes and reinforced with uniformly dispersed 3D fiber networks.

In order to estimate the reinforcing effect of the different fiber types under tensile loads, the fiber efficiency factor may be considered from the simple rule of mixture for tensile strengths and moduli, as shown below:

$E_r = E_u V_u + K_{ef} E_f V_f$-expression for modulus $\sigma_r = \sigma_u V_u + K_{\sigma f} \sigma_f V_f$-expression for strength where $E_r$, $E_u$ and $E_f$ are the tensile moduli of the reinforced foam, unreinforced foam and fibers respectively, $V_u$ and $V_f$ are the volume contents of unreinforced foam and fibers, respectively, and $K_{ef}$ is the fiber efficiency factor of tensile modulus ranging from 0 to 1.

One of the appealing aspects of the composite foam material described in this work is the prospect of thermoforming. For example, a PAN-based neat foam exhibits strong potential for thermoforming, and the addition of aramid fiber reinforcements does not compromise that potential. A thermoforming process of the invention includes three stages—preheating, warm forming, and cooling under pressure. The parameters of each stage (time temperature, pressure) can be readily adjusted to avoid cracking, wrinkling and other process-induced defects, and the material readily formed to a desired shape. This quality may permit the construction of sandwich panels in a wide variety of curved configurations.

The vibration infiltration method of the invention is useful for the synthesis of long fiber-reinforced thermoplastic foam. For example, the methods of the invention can be used for expandable thermoplastic microspheres of PAN reinforced with random 3D fiber preforms of polyester, glass, aramid fibers or a combination thereof. Considerations for producing composite foams according to the invention include the ratio of unexpanded to expanded microspheres, preform permeability, vibration infiltration of the microspheres into the fiber preforms, adhesion of fibers to the microspheres, and thermoplastic welding of the microspheres in the presence of heat and pressure in a closed mold. The methods of the invention are well-suited to scale-up and can be readily adapted to other types of microspheres and fiber performs (e.g., in addition to PAN microspheres, polyester, glass, or aramid fibers). The material can be thermoformed, raising the possibility of producing sandwich structures in a variety of curved configurations. This approach does not suffer from the inherent limitations of existing methods for producing composite foam, which stem largely from problems of controlling fiber dispersion in highly viscous blends.

The composite foams of the invention and those produced by the methods of the invention display a significant improvement in mechanical performance, including several-fold increases in tensile strength and modulus. The fibers were firmly anchored in the cellular foams and were notably effective in retarding crack growth under tensile loads. The observed improvements in basic mechanical properties suggest that this approach may be adaptable to a wide variety of polymer foams and fiber preforms, leading ultimately to new lightweight core materials with superior thermal, mechanical and physical properties.

Although the invention has been generally described above, further aspects of the invention will be apparent from the specific disclosure that follows, which is exemplary and not meant to limit the invention.

EXAMPLES

Example 1

Polyvinyl Chloride (PVC)-Fiber Composites

A non-woven aramid fiber webbing was selected for the preform. This product (supplied by Tex Tech Industries, Inc.) is produced via a dry laid carding process without needle punching. A brief description of the webbing structure is given here, and details of the carding process are provided by the manufacturer. The product is a unidirectional, light weight webbing sheet that is subsequently stacked to produce a permeable fiber preform with loft. Layers can also be cross-lapped to form bi-directional webbing.

The webbing used was comprised of chopped aramid fibers (Kevlar® 29), 75 mm long. FIG. 1 illustrates the fiber arrangement of the unidirectional webbing. The webbing pre-form has a layered structure. Fibers extend primarily in one direction (X), although there is some waviness within the layers. A degree of fiber crossover between layers holds the preform together. Most of the composite foam samples were reinforced with this unidirectional webbing. A small number of samples were also fabricated with bi-directional webbing to investigate the effects of fiber architecture on tensile properties.

The webbing preform was treated with phenolic resin to create a preform comprised of 23 wt % resin. The phenolic resin was added as a coating to stiffen the fiber network by bonding fibers at crossover and contact points. Coating was achieved by spraying the webbing with a 5 wt % solution of phenolic resin (Schenectady International, Inc.) in acetone, followed by drying for 30 min at room temperature and curing for 30 min at 200° C. The amount of phenolic resin on the fiber web was controlled by varying the spray time. Treatments of 5 and 40 seconds led to preform resin contents of 4 and 23 wt %. FIG. 1c shows a typical unidirectional preform with 23 wt % phenolic resin.

Foam synthesis was accomplished by vibration infiltration. A blended mixture of expanded and unexpanded PVC microspheres (Expancel, Inc.) with average original diameters 40 and 10 $\mu$m respectively, and with a weight ratio of 6:1 was combined with the treated fiber pre-form cut from webbing stock to match mold dimensions. Once infiltrated, the assembly was placed in a closed mold and heated to 150° C. for 20 minutes to expand the microspheres and fuse them together into composite foam.

The standard composite foam used for the majority of experiments was comprised of 10 wt % unidirectional fiber webbing, 3% phenolic resin, and 87% PVC microspheres, and the foam density was 100 kg/m$^3$ (6 pcf). Variants of the composite foam were synthesized to investigate specific parametric effects. For example, a second type of foam with 4 wt % fiber loading was also synthesized and used for tensile and compression experiments. Also, some foams were made with 0.4 wt % phenolic, and bidirectional webbing was used in place of unidirectional webbing in another. Two unreinforced PVC foams of equal density were selected as baseline materials for comparison purposes. One foam was synthesized from expandable microspheres, and the second was cross-linked PVC foam supplied by DIAB Corp (Divinycell H-100).

Figure 2:
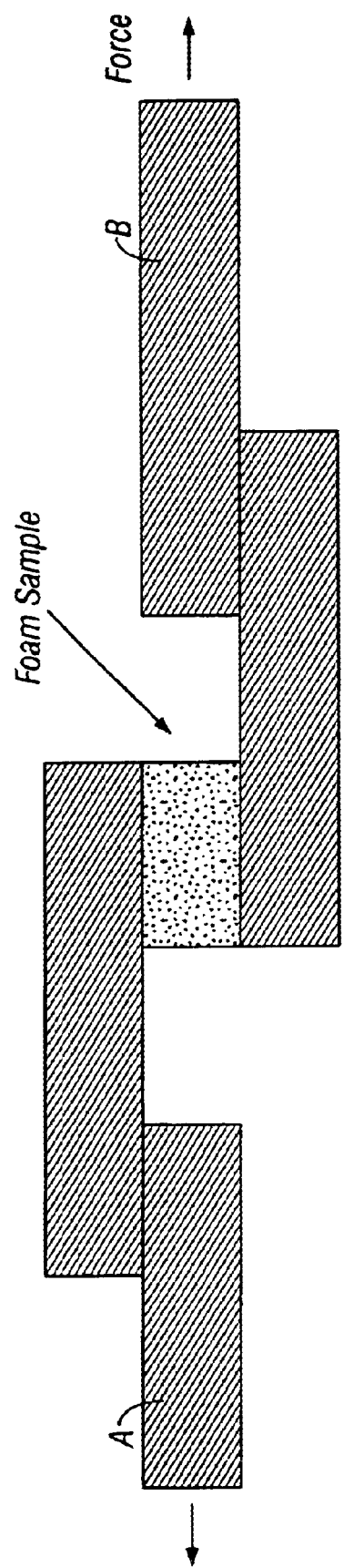
FIG. 2 is a schematic of a shear test fixture following ASTM C 273 testing. Steel plates A and B are attached to a foam sample of equal thickness (6 mm), and exert a shear force.

The tensile, flexural, and compression testing of foam samples was carried out in accordance with ASTM standards D 1623-78, D-790, D 1621-73, respectively, using at least five replicates per test condition. Test samples were cut using a band saw. Shear tests were performed according to the C-273 standard using the custom-built fixture shown in FIG. 2. The fixture ensures parallel motion of upper and lower platens to produce conditions of pure shear. Crack resistance and damage tolerance were assessed by three-point bend testing of edge-notched foam beams. A razor blade was used to introduce notches 0.2 mm wide and ~1 mm deep. The stress-strain energy density was calculated for tensile and shear tests, and the total energy was evaluated for flexural tests according to ASTM standard procedures.

Figure 3:
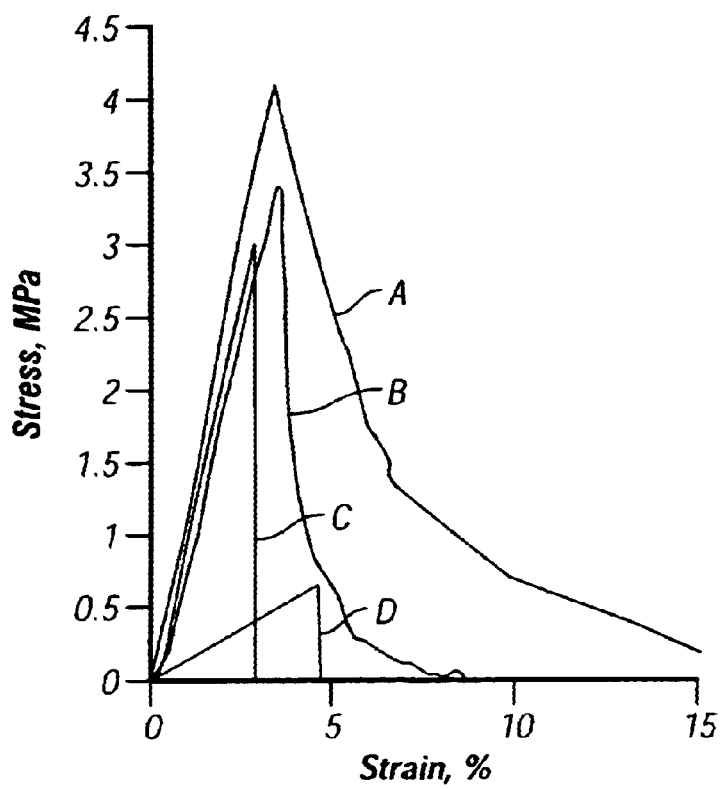
FIGS. 3A-D is a graph showing the tensile stress-strain plot for PVC foam samples with density=100 kg/m$^3$: (A) Foam reinforced with 10 wt % aramid fibers treated with 3 wt % phenolic resin, (B) Foam reinforced with 4 wt % aramid fibers treated with 1.2 wt % phenolic resin, (C) Cross-linked commercial PVC foam, and (D) Unreinforced PVC foam based on microspheres.

Tensile tests were conducted on composite foams with 4 and 10% fiber loadings. FIG. 3 shows tensile stress-strain curves for the two composite foams and the two unreinforced foams. The composite foams show substantial improvements in strength and modulus over the neat foams. The curves also indicate that the failure behavior for the foams is different. The unreinforced foams show brittle failure—an abrupt loss of load-carrying capacity after peak stress. In contrast, the composite foams demonstrate an ability to carry substantial loads to strains well beyond the ultimate stress. This indicates potential for greater damage tolerance, increased fracture resistance, and higher energy absorption capacity.

The stress-strain data, summarized in Table 1, provide a basis for quantitative comparison of the foams. For the composite foam with 4 wt % fibers, the tensile strength and modulus is increased factors of 5 and 6.5 compared with the unreinforced control foam. The composite foam with 10 wt % fibers shows improvements in strength and modulus of 6.2' and 7.8'. Increasing the fiber loading from 4 wt % to 10 wt % causes an additional increment in modulus and strength of only 20%. When compared with the commercial cross-linked control foam, the tensile strength of the two composite foams increases by 10% and 40%.

TABLE 1

| | Tensile properties | | | | | |
|---|---|---|---|---|---|---|
| | Strength MPa | % | Modulus MPa | % | Strain energy density J 10$^{-6}$/m$^3$ | % |
| Unreinforced foam | 0.66 ± 0.05 | 100 | 15 ± 1 | 100 | 1.5 ± 0.2 | 100 |
| Foam reinforced with 4 wt % fibers | 3.4 ± 0.3 | 515 | 97 ± 9 | 646 | 7.6 ± 0.6 | 507 |
| Foam reinforced with 10 wt % fibers | 4.1 ± 0.4 | 621 | 120 ± 10 | 800 | 20 ± 1.5 | 1333 |
| Cross-linked PVC commercial foam | 3.0 ± 0.2 | 455 | 104 ± 9 | 693 | 4.3 ± 0.3 | 287 |

The composite foams show distinctly different performance after reaching the peak stress. Note that the strain at peak strength for all foam samples is similar, although the ultimate strain is significantly higher for the composite foams. However, for composite foams with 10 wt % and 4 wt % fibers, the strain-to-failure increases by factors of 3.3 and 1.6, respectively, compared with the control foam. Furthermore, the area under the stress-strain curves is far greater for the composite foams. The integrated area provides a measure of energy absorbed during fracture, and thus crack resistance. This quantity, normally referred to as the strain energy density, is tabulated in Table 1. The strain energy values represent the integrated area under the load-deformation curve, and thus include stages both before and after the peak load (FIG. 3). The results show that composite foams have much higher strain energy density than the unreinforced control foam (factors of 5 and 13) and the cross-linked PVC foam (factors of 1.8 and 4.6).

The tensile fracture surfaces of composite foam samples revealed mechanisms responsible for the performance enhancement. In both composites, there was evidence of extensive fiber pullout in the form of fibers extending from the foam. Higher fiber content led to multiple fractures on the composite foam surface, a consequence of incomplete microsphere infiltration during processing. The 10 wt % composite foam exhibited fragments of foam adhering to partly exposed fibers embedded in the bulk foam. In the 4 wt % fiber foam, the foam had greater structural integrity, and consequently the foam has not fragmented extensively. Exposed fiber ends extended from the fracture surface.

Figure 4:
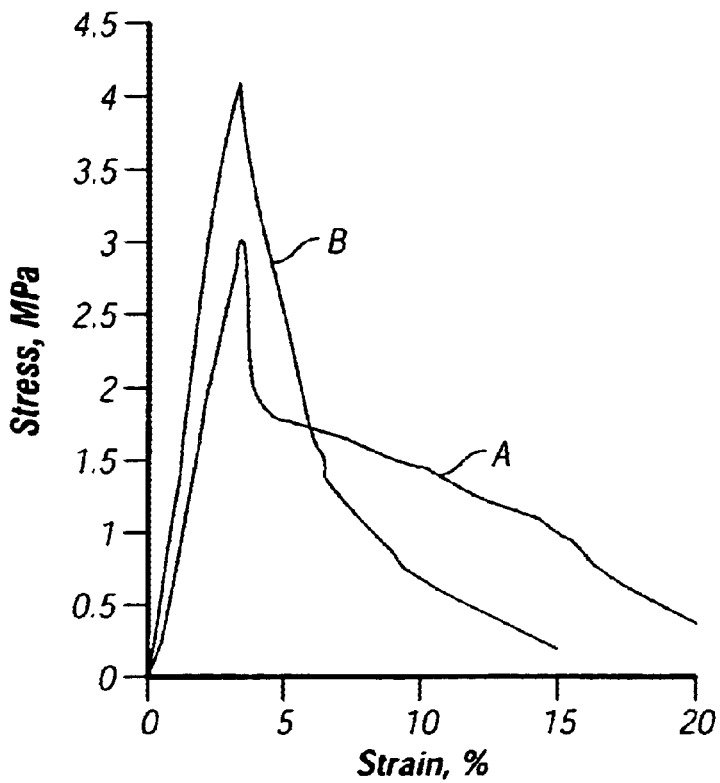
FIG. 4 is a tensile stress-strain plot for PVC composite foam reinforced with 10 wt % fiber webbing treated with 0.4 wt % phenolic (curve A), and 3 wt % phenolic (curve B).

Treatment of fiber pre-forms with different amounts of phenolic resin led to markedly different foam behavior, as shown in FIG. 4. Foam reinforced with 10 wt % fiber webbing and 3 wt % phenolic showed an ultimate stress 29% higher than foam reinforced with webbing and 0.4 wt % phenolic. The latter foam retained considerable load-carrying capacity after yielding. Yielding was accompanied by a large drop in stress, followed by a gradual decline, during which the fibers carried most of the applied load.

Preforms treated with more phenolic resin produced composite foam with improved tensile properties, but the stronger foam carried lower load levels after peak stress, as shown in FIG. 4. This can be attributed to the difference in fiber pullout length, which was greater in the foam with less phenolic because the density of bonded nodes was lower. The greater pullout lengths, supported by qualitative SEM observations, enabled the low-phenolic foam to carry higher load levels beyond peak load. The calculated energy density for foams made from preforms with different amounts of phenolic was about the same, despite the clear differences in stress-strain behavior. By controlling node density in a preform one of skill in the art can design foam preforms to deliver a range of foam properties not possible with unreinforced foams.

As described herein, the unidirectional fiber preforms had a layered structure in which fibers extended predominantly in one direction but tended to interlock within the layers. The composite foams exhibited anisotropic properties, as summarized in Table 2. Composite foams based on unidirectional and bi-directional fiber webs were tensile tested in X, Y, and Z directions. Foams produced from unidirectional webbing exhibited tensile strengths in the X, Y, and Z directions in the ratio of 3:1.4:1. Meanwhile, foam produced from XY-type webbing showed tensile strengths in the X, Y and Z directions in the ratio of 2.6:2.6:1. In contrast, unreinforced foam exhibited isotropic properties.

TABLE 2

Tensile strength of unreinforced and composite foams based on PVC microspheres

| | Tensile properties | | |
|---|---|---|---|
| Type of foam | Strength in X direction MPa | Strength in Y direction MPa | Strength in Z direction MPa |
| Unreinforced foam | 0.7 ± 0.07 | 0.7 ± 0.06 | 0.7 ± 0.07 |
| Foam reinforced with unidirectional web material | 4.1 ± 0.3 | 3.0 ± 0.4 | 1.3 ± 0.1 |
| Foam reinforced with bi-directional web material | 3.4 ± 0.2 | 3.4 ± 0.3 | 1.3 ± 0.1 |

Figure 5:
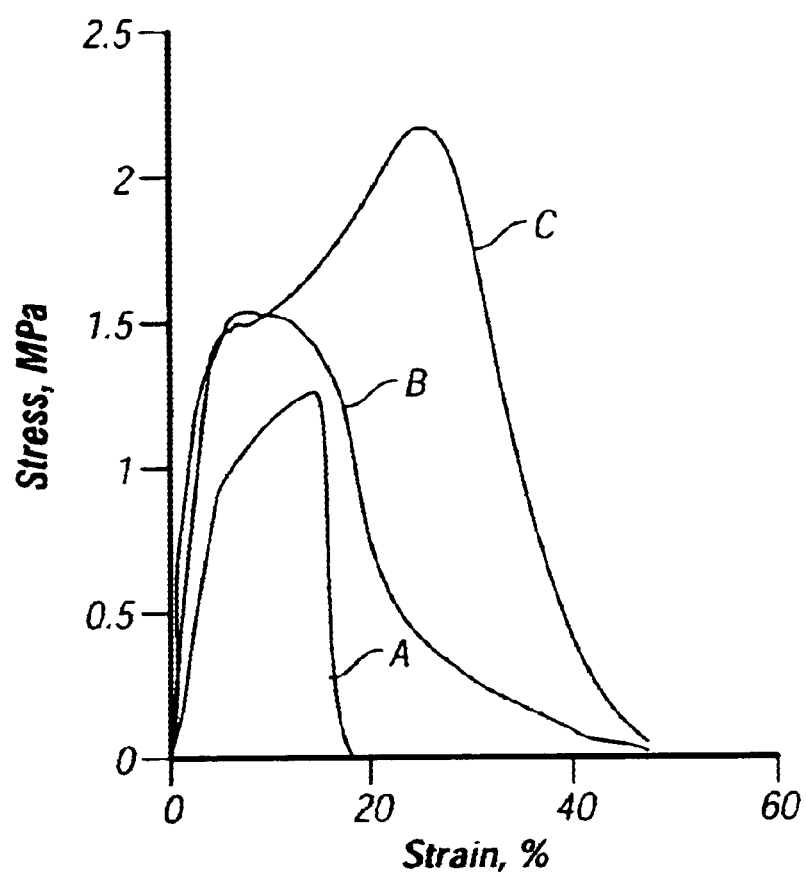
FIG. 5 is shows stress-strain curves for foam samples with density=100 kg/cm$^3$, including unreinforced foam based on PVC microspheres (curve A), cross-linked commercial PVC foam (curve B), and PVC composite foam PVC (10 wt % fibers, 3 wt % phenolic), with fibers perpendicular to the shear plane (curve C).

Shear tests were conducted on standard composite foam samples in which the fibers were arranged perpendicular and parallel to the shear plane. Typical stress-strain curves for composite foam and for the two unreinforced foams are shown in FIG. 5. The composite foam and the cross-linked unreinforced foam show a smooth decrease in stress after the ultimate stress, although the ultimate stress for the composite foam is substantially higher. In contrast, the unreinforced foam made from microspheres fails in a brittle manner, with an abrupt loss of load-carrying capacity at the ultimate stress level, which is far lower than the other two foams. Table 3 summarizes the data for shear strength, modulus and strain energy density. The strain energy density was calculated from the areas under stress-strain curves. The ratio of the shear strength of the composite foams with perpendicular fibers, with parallel fibers, the cross-linked commercial foam, and the unreinforced foam is 1.75:1.28:1.2:1, while the ratio of the shear modulus of the composite foams, the cross-linked commercial foam, and the unreinforced foam is 2.35:1.86:1.35:1.

TABLE 3

Shear properties of unreinforced foams and composite foam

| | Strength MPa | % | Modulus MPa | % | Strain energy density J $10^{-6}/m^3$ | % |
|---|---|---|---|---|---|---|
| Unreinforced foam | 1.25 ± 0.1 | 100 | 22 ± 3 | 100 | 14 ± 2 | 100 |
| Foam reinforced with 10 wt % perpendicular fibers to shear plane | 2.2 ± 0.1 | 176 | 52 ± 6 | 236 | 64 ± 7 | 457 |
| Foam reinforced with 10 wt % parallel fibers to shear plane | 1.6 ± 0.2 | 128 | 41 ± 3 | 186 | 43 ± 5 | 307 |
| Cross-linked PVC commercial foam | 1.5 ± 0.1 | 120 | 38 ± 5 | 172 | 31 ± 4 | 221 |

Important metrics for comparison of foam performance, especially with regard to impact resistance and damage tolerance, are the strain-to-failure and the energy absorbed during fracture. Regarding the first metric, the strains-to-failure for the composite and for the cross-linked commercial foam are similar, and both are more than twice the unreinforced foam. However, the strain energy density for the composite foam is two times greater than the cross-linked commercial foam, and 4.6 times greater than the unreinforced foam.

Figure 6:
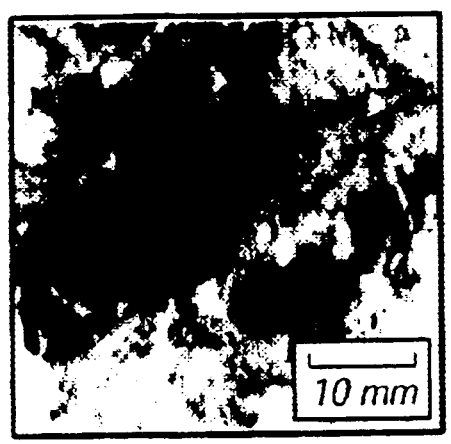
FIGS. 6A-B is a micrograph showing cracks in shear-tested composite PVC foam (10 wt % aramid fibers, 3 wt % phenolic resin). (A) Crack region showing fiber bridging. (B) Crack region showing fibers well-bonded to PVC microspheres.
Figure 6:
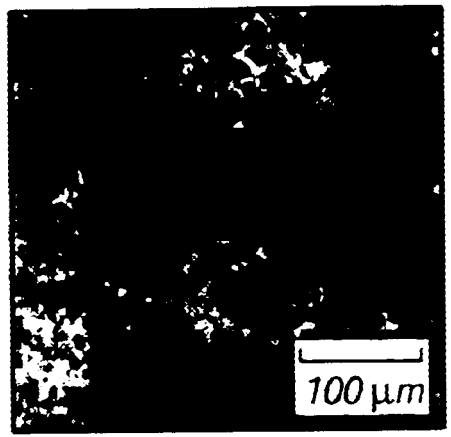

Examination of the composite fracture surfaces revealed long fibers extending from the foam matrix which evidently bridged the crack prior to pulling out, as shown in FIG. 6. The fibers extended at various angles to the fracture surface, a consequence of the absence of strict fiber orientation in the web structure, as described previously. The exposed fiber lengths were typically several millimeters, but were significantly shorter than the average length of the chopped fibers (75 mm), indicating that the remaining lengths were embedded within the foam structure. Earlier work showed that similar long fibers embedded in foams may break rather than pull out during fracture, suggesting effective load transfer and fiber-foam adhesion. FIG. 6b supports this contention, showing that local failure is both adhesive and cohesive. Some fibers are bare of microspheres, while other fibers are covered with microspheres that adhered to the fiber during pullout.

Figure 7A:
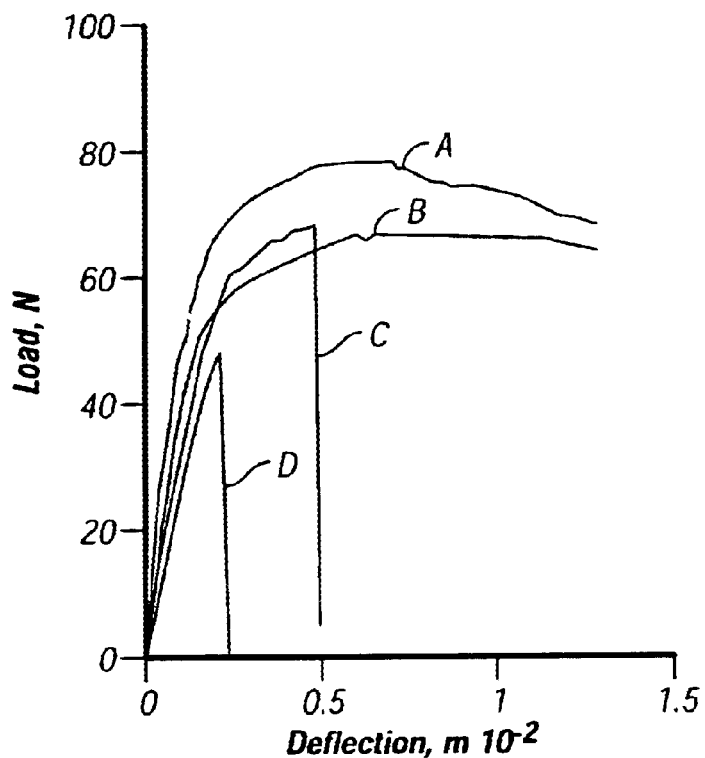
FIG. 7 shows load-deflection data from flexural tests for foam materials with density=100 kg/m$^3$. (A) compares un-notched and notched beams of PVC composite foam (curves A and B) with un-notched and notched beams of cross-linked commercial PVC foam (curves C and D) respectively. (B) compares un-notched and notched beams of PVC composite foam (curves A and B) with un-notched and notched beams with un-notched and notched foam made from PVC microspheres (curves E and F), respectively.

Flexure tests were conducted on unnotched and notched beams of the standard composite foam to investigate the influence of fiber reinforcement on crack resistance and damage tolerance. Fibers were arranged parallel to the length of the beam. Representative test data are shown in FIG. 7. Unreinforced foams show brittle behavior in both the notched and unnotched conditions, and the flexural strength is significantly lower for the notched beams (FIG. 7a). However, the composite foam shows much higher flex strength and practically absence of strength decrement in the notched condition. The strength decrements for the notched unreinforced and composite foams were 37% and 1% respectively. Perhaps more significantly, both the notched and unnotched composite beams continued to carry load far beyond the yield and ultimate stress levels. This behavior derives from the fibers, which effectively carry substantial load after the foam yields.

The fibers also impart a substantial increment in energy dissipation compared with the unreinforced foam, as summarized in Table 4. Here, the total work is measured by the area under the load-deflection curve, in accordance with ASTM D 790. Calculations were based on effective cross-sections of the beams (excluding the notch area). The energy dissipated by the notched composite foam was nearly 60 times greater than the unreinforced foam, and the notch-induced decrement in energy absorption was 77% for the unreinforced foam, compared with only 15% for the composite foam.

support this contention. The photo on the left shows the notched unreinforced commercial foam, in which the crack has split the beam at a vertical deflection of 2.5 mm, eliminating all capacity to carry load. In contrast, the notched composite beam shown on the right continues to carry 90% of the maximum load and to resist crack growth, even at a deflection of 14 $\mu$m.

Measurements of compressive strength of the composite foam showed that the aramid fibers had a slightly detrimental effect. This is consistent with previous reports that found that aramid fibers failed to enhance compression properties of PAN-based foam. Table 5 shows the compressive strength and modulus for unreinforced foam and foam reinforced with 10 wt % unidirectional web treated with 3 weight %

TABLE 4

Flexural properties

|  | Strength MPa | Change % | Modulus MPa | Change % | Total energy J | Change % |
|---|---|---|---|---|---|---|
| Notched unreinforced foam | 0.58 ± 0.06 | 63/100 | 19 ± 0.3 | 99/100 | 0.01 ± 0.001 | 23/100 |
| Un-notched unreinforced foam | 0.92 ± 0.08 |  | 19 ± 0.2 |  | 0.04 ± 0.003 |  |
| Notched foam reinforced with 10 wt % fibers | 2.9 ± 0.3 | 99/100 | 77 ± 0.6 | 99/100 | 0.59 ± 0.04 | 85/100 |
| Un-notched foam reinforced with 10 wt % fibers | 2.9 ± 0.2 |  | 77 ± 0.8 |  | 0.69 ± 0.08 |  |
| Notched cross linked PVC commercial foam | 2.2 ± 0.2 | 85/100 | 52 ± 0.7 | 99/100 | 0.06 ± 0.004 | 25/100 |
| Un-notched cross-linked PVC commercial foam | 2.5 ± 0.3 |  | 52 ± 0.6 |  | 0.24 ± 0.03 |  |

Figure 7B:
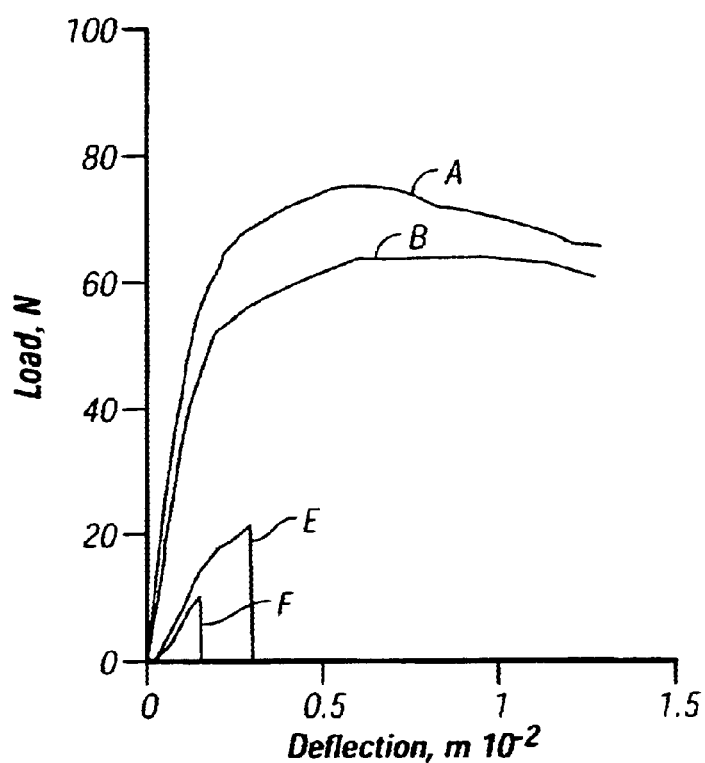

Comparisons between the composite foam and the unreinforced commercial foam highlight some of the advantages of fiber reinforcement (FIG. 7b). First, both unnotched and notched samples of the commercial foam show brittle failure after the ultimate stress, while composite foams continue to carry loads within 10% of the peak load for strains 2–5 times greater. Second, notched beams of unreinforced cross-linked foam show substantially lower ultimate load and ultimate deflection than un-notched beams, while notched beams of composite foam retain 85% of the load-carrying capacity after peak stress, for deflection several times larger than the deflection at peak stress. Thus, the notch sensitivity of the composite foam is substantially less than that of the cross-linked unreinforced foam.

Figure 8:
FIGS. 8A-B is a micrograph showing crack resistance of notched foam samples. (A) Cross-linked PVC foam at 2.5 mm deflection with zero load capacity. (B) Composite foam (10 wt % fiber, 3 wt % phenolic) at 14 mm deflection and 60 N load. Beams correspond to load deflection data shown in FIG. 7.
Figure 8:
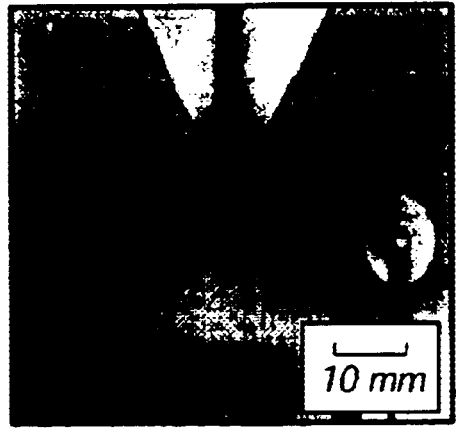

The two foams show significant differences in energy absorption during fracture, as shown in Table 4. Calculation of total energy absorption was determined by the measured area under the load-deflection curve, in accordance with ASTM-D 790. The composite foam showed a decrement of ~15% in the notched condition, while the unreinforced commercial foam showed a decrement of 75%. Even in the notched condition, the composite foam showed substantially higher energy absorption than the unreinforced commercial foam in the unnotched condition. These data highlight the remarkable crack resistance and damage tolerance potential of composite foam reinforced with long aramid fibers. Examination of the notched foam beams, shown in FIG. 8, phenolic resin. Fibers were arranged parallel to the direction of loading. Data for cross-linked PVC foam is presented also. Neat and fiber-reinforced foams exhibit compressive strength values 20 and 30% less than the cross-linked foam.

TABLE 5

Compression properties

|  | Strength MPa | % | Modulus MPa | % |
|---|---|---|---|---|
| Unreinforced foam | 1.3 ± 0.2 | 100 | 81 ± 7 | 100 |
| Cross-linked PVC commercial foam | 1.6 ± 0.3 | 123 | 120 ± 11 | 148 |
| Foam reinforced with 10 wt % fibers | 1.2 ± 0.1 | 92 | 76 ± 8 | 94 |

Reinforcement with long aramid fibers led to significant improvements in the properties of microsphere-based PVC foam. The composite foam properties generally matched or surpassed those of cross-linked PVC foam, with the exception of compression strength. The strength and modulus of the composite foam in tension and shear increased several-fold compared to unreinforced foam, as shown in Tables 1 and 3. Not surprisingly, the tensile properties increased about 3 times more than the shear properties. This effect can be attributed to the anisotropic fiber architecture. Experiments were carried out primarily on composite foams reinforced with unidirectional fiber pre-forms, and fibers were arranged parallel to the tensile axis, giving maximum efficiency.

The greatest improvements associated with the composite foam were achieved in energy absorption during fracture. The strain energy density calculated from the areas under stress-strain curves provides a useful estimate of resistance to crack growth and the energy absorbed during fracture. In general, crack growth is easier in materials with lower strain energy density. The reason for the remarkable increase in crack growth resistance observed in the composite foam can be attributed largely to crack bridging, a phenomenon in which unbroken fibers span the crack wake and oppose crack opening. Microstructural observations support this contention, showing aramid fibers that span the crack wake and resist crack opening. Models for crack bridging quantify the contribution of fibers and various energy absorption processes that occur in the reinforcement zone near the crack tip, the so-called R-zone.

Resistance to crack growth was measured directly on notched foam beam samples. Remarkably, the composite foam showed negligible notch sensitivity. The decrement in flexural strength of composite foam was only 1%. In contrast, the flexural strength decrement in notched beams for unreinforced and partly cross-linked foams was 37% and 15%, respectively, while the decrement in energy dissipated was approximately 4-fold for both unreinforced foams.

The notch sensitivity of different polymers was treated in detail by Kausch, who showed that ductile polymers have superior resistance to crack growth from a sharp notch compared with brittle polymers. In ductile polymers, the high mobility of molecular chains effects a local redistribution of stress around stress concentrations such as cracks. In contrast, the unreinforced foams examined here are brittle and there is little redistribution of stress around crack tips. These observations are consistent with the report by Gilmer et al, who showed that the same partly cross-linked PVC foam shows brittle behavior. The partial cross-linking of the PVC improves the strength of the foam, but also reduces the flexibility of molecular chains, making it more brittle.

Compression strength was the sole property that did not show benefit from fiber reinforcement. While this is not too surprising, given that fibers are not particularly suited to carrying compressive loads, there are prospects for improving compression strength with different fibers. Recent work by Shen et al. has shown substantial improvements in compression strength of composite foams reinforced with short glass fibers. This raises the prospect of designing composite foams with hybrid reinforcements selected to deliver specific combinations of property enhancement required by particular applications.

Example 2

Polyacrylonitrile (PAN)-Fiber Composites

Several types of fiber preforms were selected for evaluation. The preforms consisted of random, 3D arrangements of fibers, much like wool or cotton. Composite foams were synthesized using 30 wt % polyester fibers, 8 wt % aramid fibers, and 8 wt % glass fibers. Unreinforced foam was also synthesized and tested for comparison. The polyester fiber preform (commercially available as "NU-Foam") consisted of fibers with an average length of ~50 mm. Aramid and glass preforms were fabricated from Kevlar® 49 and E-glass fibers, respectively (with average lengths ~100 mm). Properties of the fibers are shown in Table 6.

TABLE 6

Properties of reinforcing fibers

| | Density g/cm$^3$ | Tensile modulus GPa | Tensile strength GPa |
|---|---|---|---|
| Kevlar ® 49 | 1.44 | 131 | 3.8 |
| E - Glass | 2.55 | 72 | 3.5 |
| Polyester | 1.38 | 5.1 | 0.32 |

Expandable microspheres based on thermoplastic polyacrylonitrile (PAN) were obtained from Expancel, Inc. and were used for preparation of the basic foam material. Each hollow microsphere consisted of a thermoplastic shell encapsulating a hydrocarbon liquid blowing agent such as isopentane. Before expansion, the microspheres were 10 micrometers in diameter, and heating of unconstrained microspheres typically resulted in mean diameters of 40 micrometers. Unexpanded and expanded microspheres were blended in selected ratios, then poured into a mold to fill the volume. The mold was then heated to accomplish expansion. The proportion of unexpanded and expanded microspheres was adjusted to control the final foam density (typically ~100 kg/m$^3$).

The process of foam synthesis used microsphere expansion in a constrained space. During heating, the blowing agent expanded, stretching the softened shells of the unexpanded microspheres and expanding the sphere volume by about 60 times. In the heated closed mold, the mutual impingement of expanding microspheres created pressure and facilitated welding of adjoining microspheres. A mixture of expanded and unexpanded microspheres was required to produce foam free of cracks. Expanded microspheres filled empty spaces and prevented excessive displacements during foam expansion, while unexpanded microspheres expanded during heating and generated the hydrostatic pressure need for thermo-welding.

The process parameters for foam synthesis were developed empirically, relying on microstructural characterization to determine quality. Time-temperature-density conditions were developed to expand the microspheres and fuse the assembly into foam without damage (typically 177° C. for 20 minutes). If time or temperature were insufficient, the microspheres did not fully expand, and welded without strong inter-cellular cohesion, producing weak foam. For example, when foam samples were heated to 160° C. for 15 minutes, expansion was incomplete. Microsphere diameters varied widely from 10 micrometers in the unexpanded state to 40 micrometers in the fully expanded state. Undamaged microspheres were often poorly welded to each other, leaving large interstitial spaces between them.

Figure 9:
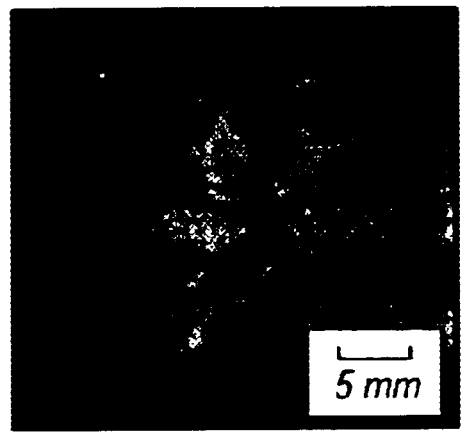
FIGS. 9A-B show (A) Foam produced from unexpanded microspheres; (B) Foam produced using a 7:1 mixture of unexpanded and expanded microspheres.
Figure 9:
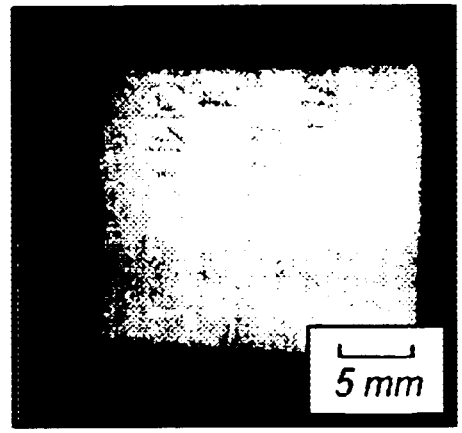

A mixture of unexpanded and expanded microspheres was required to produce foam free of cracks. Using unblended microspheres resulted in inferior foams characterized by large void channels. Typically, a 7:1 weight ratio of unexpanded to expanded microspheres was used to produce high-quality foam with a density of ~100 kg/m$^3$ (6.2 pcf). This ratio of unexpanded to expanded microspheres yielded crack-free foam, as shown in FIG. 9. Other foam densities were produced by changing the proportion of unexpanded and expanded microspheres.

The process for fabricating fiber-reinforced foam involved vibratory infiltration of dry microspheres into a fiber preform, then heating the infiltrated preform in a closed mold to expand the microspheres and fuse them together. First, aramid and glass fiber preforms were surface-treated to improve chemical adhesion to the microspheres. Treatment was carried out in a dilute solution of epoxy in acetone. Commercial grade epoxy resin 2000 and hardener 2120 (Fibre Glast Corp.) was mixed in a 3:1 weight ratio, and added to the acetone. Treated fiber preforms were dried at room temperature for 30 min to remove the acetone, then placed in the mold, completely filling the volume. A blended mixture of expanded and unexpanded PAN microspheres (weight ratio of 7:1) was poured over the fiber preform and a sonic actuator was used to mechanically vibrate the mold for 20 minutes. The vibration caused the microspheres to infiltrate the preform. The fiber volume loading in the mold was 3, 0.3, and 0.6% for polyester, glass, and aramid fibers, respectively, and fibers were uniformly dispersed in the mold cavity. Microspheres occupied the interstitial volumes between fibers. The mold was then closed and heated to 177° C. and held for 20 minutes to expand the microspheres.

Figure 10:
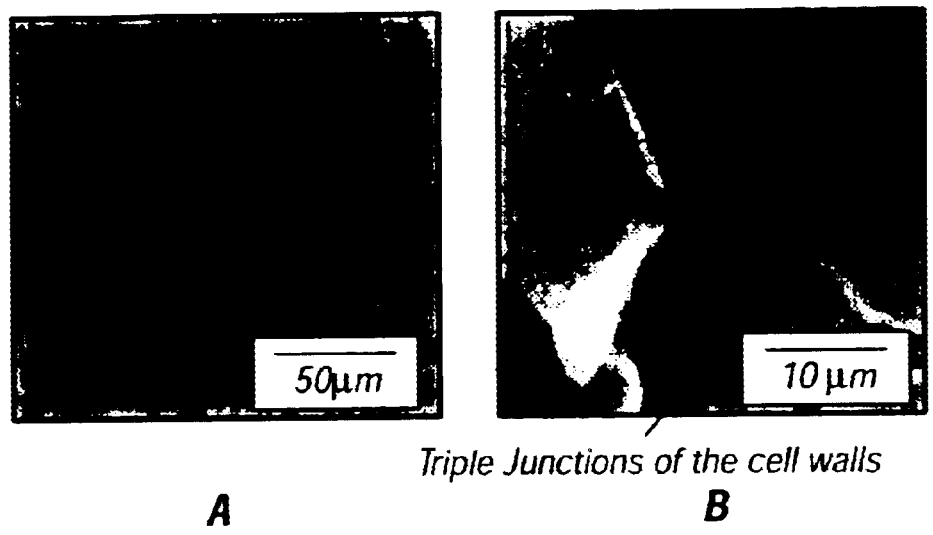
FIG. 10 collectively includes SEM images of neat foam sample prepared using methods of the invention: a) global view, and b) enlarged region showing triple junction.

Adjusting the process parameters resulted in superior foam quality, as shown in FIG. 10. Here, the sample was heated to 177° C. and held for 20 minutes. The microspheres were welded more efficiently, leaving few interstitial spaces between them. Occasional ruptures of the microspheres are apparent in the images, which may be an artifact of the sample preparation. The enlargement shown in FIG. 9b shows cell walls that have fused together to form triple junctions, and a tear in one of the cell membranes (dark patch in the lower region of the frame) that probably occurred during sectioning. Extensive examination of similar regions indicated good welding of adjoining cells. After developing a reliable process for producing neat foam, the process was modified to produce composite foams, as described herein.

The tensile and compressive strength of selected foam samples was measured using a universal testing machine. Tensile tests were performed on unreinforced and composite foam samples (reinforced with polyester, aramid or glass fibers) according to ASTM Standard D3822-94. Neat and composite foam samples of various densities were tested in compression according to ASTM D1621-73 at temperatures from 25–125° C.

The formability of foam samples was evaluated using a hot press and a simple bend tool. A flat foam plate was placed between two faces of a steel tool with a bend radius of 50 mm. A suitable forming temperature was determined to be 120° C. Samples were heated for 15 minutes, formed under pressure for 10 minutes, and then cooled under pressure for 20 minutes. The microstructure of foam samples was examined and compared.

Table 7 shows the substantial effect of long fiber reinforcement on tensile properties of composite foams. The greatest enhancement was achieved in composite foams reinforced with aramid fibers, where the tensile strength and modulus were increased by 400 and 750%, respectively. These increments were achieved with only 8 weight percent loading. Enhancements were particularly evident in samples that included surface-treated aramid and glass fibers, while the influence of untreated polyester fibers was significantly less. Note that even polyester fibers, with only modest modulus, doubled the modulus of the foam.

TABLE 7

Tensile properties of foam

| Foam Type | Tensile Strength MPa (% change) | Tensile Modulus MPa (% change) | Failure Strain % | Fiber Weight Loading % | Fiber Volume Loading % |
|---|---|---|---|---|---|
| Unreinforced foam | 0.72 | 13 | 5.7 | | |
| PET fiber foam | 0.67 (−7) | 25 (190) | 5.0 | 30 | 3 |
| Glass fiber foam | 1.8 (250) | 51 (390) | 3.8 | 8 | 0.3 |
| Aramid fiber foam | 3.1 (430) | 98 (754) | 4.2 | 8 | 0.6 |

Figure 11:
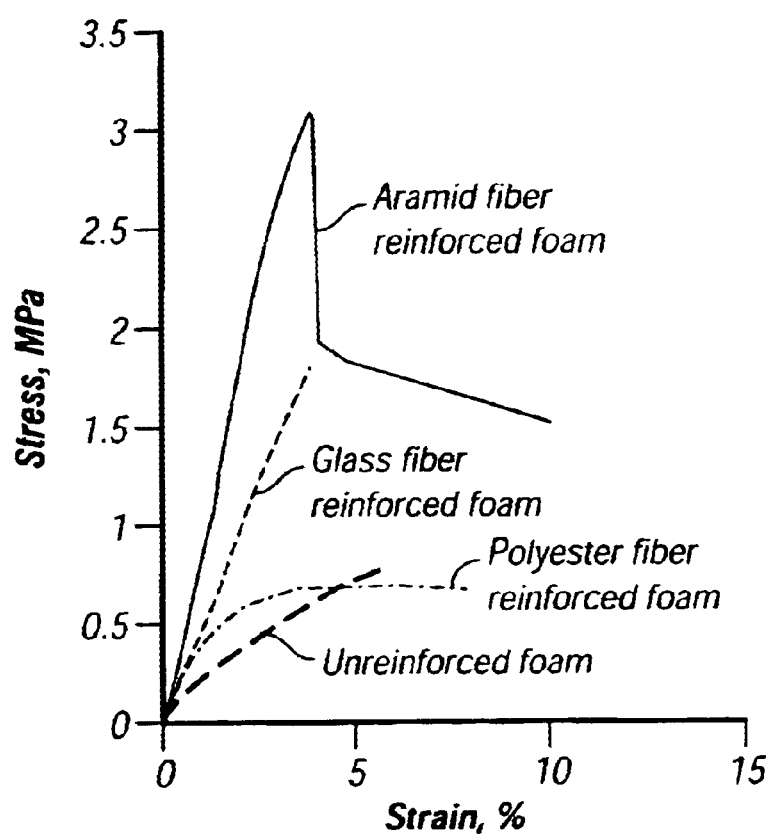
FIG. 11 shows tensile stress-strain plot for foam samples based on PAN microspheres. (A) Unreinforced foam with density=100 kg/m$^3$. (B) Foam reinforced with long polyester fibers (density=100 kg/m$^3$, fiber weight percent=30. (C) Foam reinforced with long glass fiber batt (density=100 kg/m$^3$, fiber loading=8 wt %). (D) Foam reinforced with long aramid fibers (density=100 kg/m$^3$ and fiber loading=8 wt %).

The reinforced and unreinforced foams showed markedly different behavior after reaching the ultimate tensile stress, as shown in FIG. 11. The neat and glass-reinforced foams demonstrated brittle stress-strain response, showing little capacity to carry load after yielding. However, the polyester and aramid fiber foams retained considerable load-carrying capacity after yielding. In the aramid fiber composite foam, yielding was accompanied by a large drop in stress, followed by a long stress plateau during which the fibers carried most of the applied load.

Examination of crack patterns in the different samples revealed that the unreinforced and glass-reinforced foams exhibited nearly flat cracks transverse to the load axis. Broken glass fibers protruded several millimeters from the fracture surface, contributing to the improvement in tensile properties. In contrast, the crack paths in the polyester fiber and aramid fiber foams were more complex. In particular, the aramid fiber foam exhibited a complex crack path in which transverse cracks at two sites were joined by a longitudinal crack. In both materials, fibers bridged the cracks and carried the load after yielding.

Figure 12:
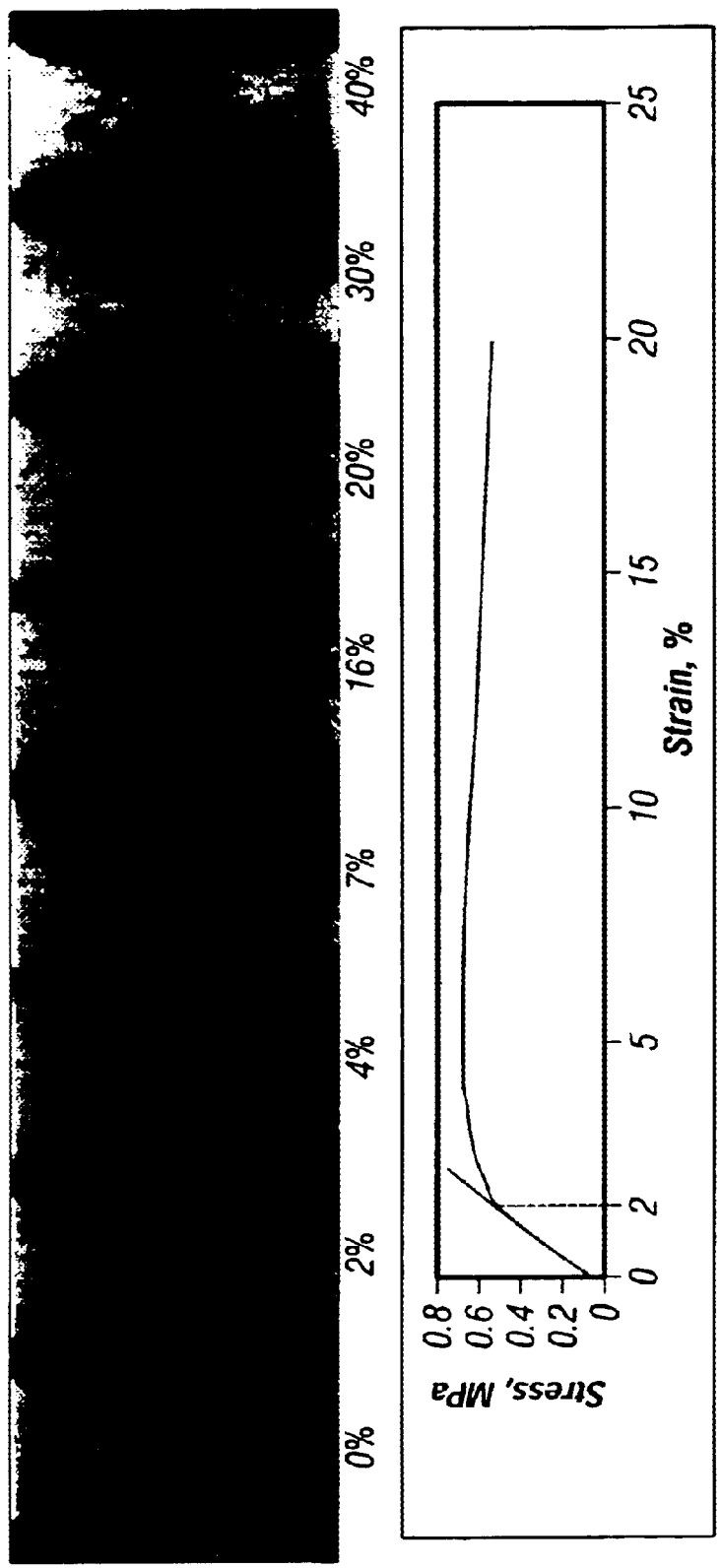
FIG. 12 shows long-term crack propagation during tensile testing of polyester fiber reinforced foam.

In the polyester fiber foam, the load increased monotonically after yielding, and no load drop was observed. This behavior was caused in part by the much greater strain-to-failure of polyester fibers compared with aramid or glass fibers, and by insufficient contact between polyester fibers and microspheres. FIG. 12 shows the evolution of crack growth and damage in polyester-fiber-reinforced foam and the associated stress-strain curve. Cracks start to grow at about 2% strain, and the fiber network carries nearly the all of the load after this point. At about 40% strain, the last of the fiber bundle gives way, and the load drops to zero.

Figure 13:
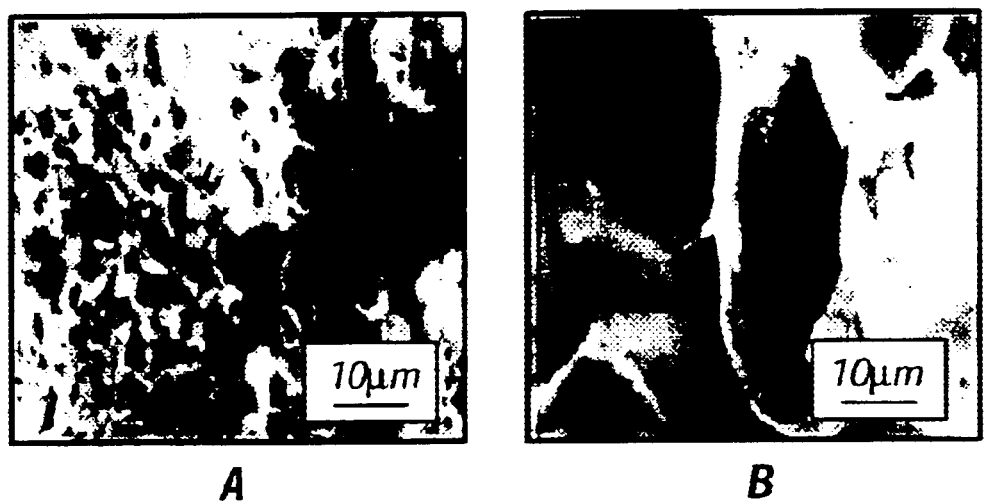
FIG. 13 shows SEM images of fractured tensile samples of neat foam. The enlargement in (b) shows torn microspheres.
Figure 14:
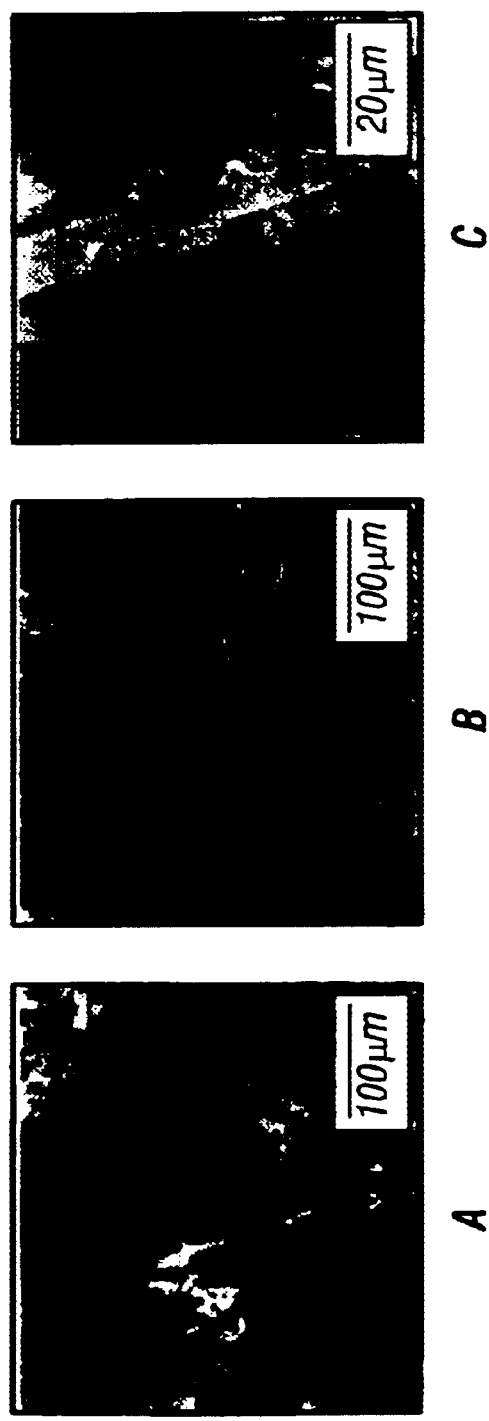
FIG. 14 shows tensile fracture surface of aramid fiber reinforced PAN foam sample: (A) segments of fibers protruding from the foam indicate crack bridging, (B) broken fibrillated fiber segment, and (C) fiber segment with bonded microspheres.

Details of the tensile fracture surfaces are revealed in SEM micrographs, as shown in FIGS. 13–14. The fracture surface of the unreinforced foam sample reveals polyhedral cell shapes, indicative of the internal pressure generated during foam expansion (FIG. 13b). Broken microspheres and cell walls are visible in FIG. 13a. In contrast, protruding fiber segments distinguished the aramid fiber composite foam fracture surfaces (FIG. 14a). Fibers extended randomly in all directions and evidently bridged the crack wake prior to pullout. In addition, some fiber segments broken during the test, as evidenced by the fibrillated appearance (FIG. 14b), indicating strong adhesion to the foam matrix. Further evidence of the strong adhesion is apparent in FIG. 14c, which shows a fiber segment that extends from the fracture surface and is covered with microspheres.

The compression properties of the composite foams are summarized in Table 8. In general, fiber reinforcement had a negligible effect on compression strength and modulus. Only in the case of glass fiber reinforcement did the composite foam show a modest improvement in compressive modulus.

Figure 15:
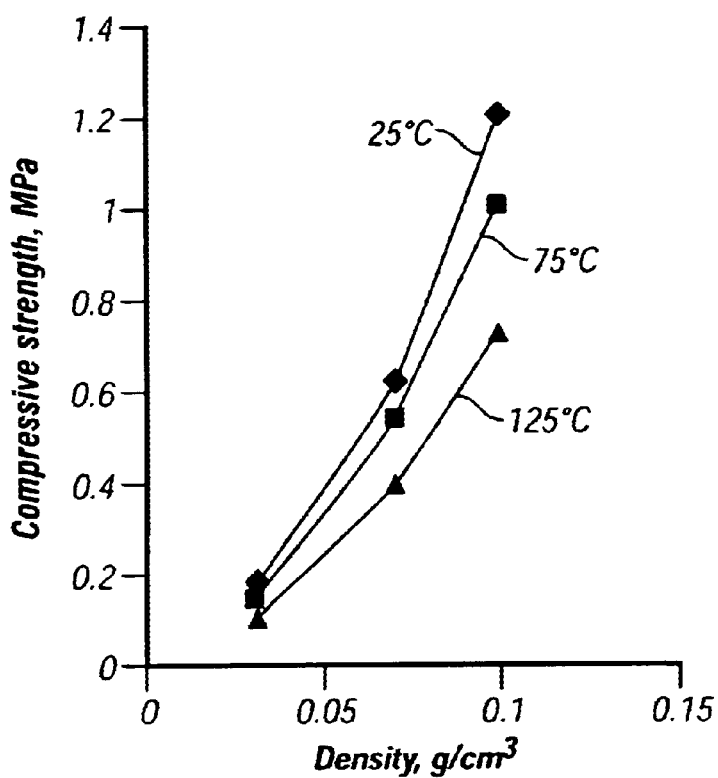
FIG. 15 shows compressive strength versus foam density for different test temperatures.
Figure 16:
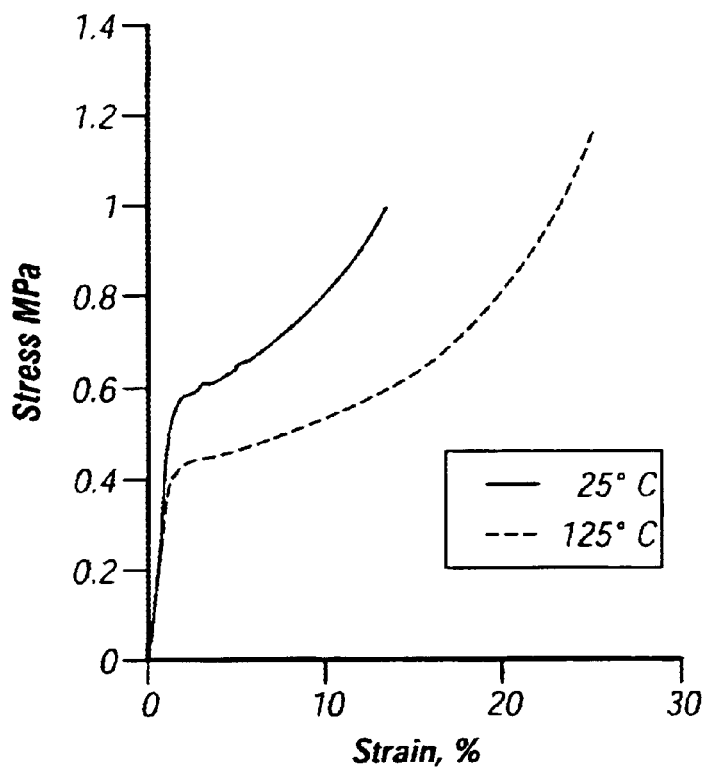
FIG. 16 shows compressive stress-strain plots at different temperatures for unreinforced foam with density=70 kg/m$^3$ (4.4 pcf).

FIG. 15 shows compression strength data for neat foam as a function of foam density for different temperatures. The PAN-based foams retain compression strength in this temperature orange, diminishing only about 30% on heating from room temperature to 125° C. Examination of the compression stress-strain curve for neat PAN microsphere foam (FIG. 16) revealed plastic behavior similar to polyethylene foam.

TABLE 8

Compression properties of foam

| Type of Foam | Compression Strength MPa | Modulus MPa | Fiber Weight % | Fiber Volume % |
|---|---|---|---|---|
| Unreinforced foam | 1.1 | 62 | | |
| Polyester fiber reinforced foam | 1.1 | 60 | 30 | 3 |
| Glass fiber reinforced foam | 1.2 | 69 | 8 | 0.3 |
| Aramid fiber reinforced foam | 1.1 | 63 | 8 | 0.6 |

Figure 17:
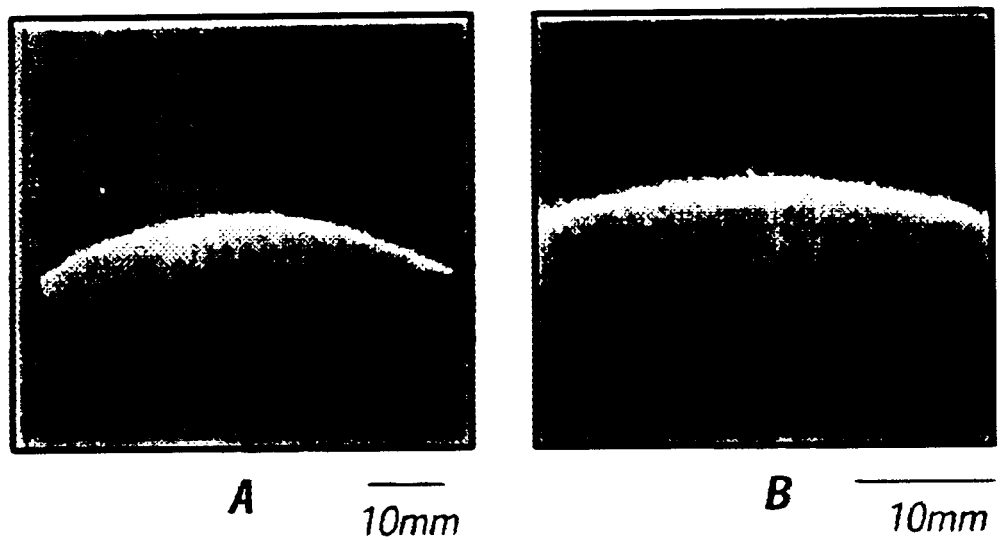
FIG. 17 is a demonstration of formability of aramid fiber reinforced PAN-based foam: (A) sample hot-formed from flat plate, and (B) enlargement showing absence of forming-induced defects.

The composite foams described in certain embodiments of the invention are based on thermoplastic microspheres and can be thermoformed after fabrication. Demonstration of this property is shown in FIG. 17, where a flat plate of aramid fiber reinforced foam was thermoformed into a bent configuration. Examination of the formed edges showed no evidence of wrinkling, cracking, or other defects (FIG. 17b).

Table 9 shows the calculated fiber efficiency factors for different fibers.

TABLE 9

Fiber efficiency factor at tensile testing of foams

| | Tensile Strength | Tensile Modulus |
|---|---|---|
| Polyester fiber based foam | 0.001 | 0.08 |
| Glass fiber based foam | 0.1 | 0.18 |
| Aramid fiber based foam | 0.1 | 0.1 |

The data reveal that with fiber efficiencies of 0.1, the potential property enhancement from fiber reinforcement is largely untapped. (A maximum value of 1 corresponds to 100% efficiency.) The efficiency factor of reinforced composites depends on parameters such as fiber length and diameter (critical length criterion), fiber dispersion and orientation, and fiber-matrix adhesion. When long fibers in a conventional (nonporous) composite are unidirectional and fiber-matrix adhesion is strong, K will approach 1 in the fiber direction. Fibers in the composite foams were largely random in 3D, and hence their contribution in the tensile direction could not exceed $\frac{1}{3}$, resulting in an efficiency factor of 0.1. Though this value is considered poor for solid composites, substantial property enhancements were achieved in the low-density composite foams. In addition, because the high-strength fibers were effectively anchored in the foams, increasing the resistance to crack growth and dissipating considerable energy during fracture.

Adhesion of fibers to microspheres also played an important role in the performance of the reinforced foam. For example, composite foams based on untreated polyester fibers showed no improvement in tensile strength. The absence of chemical adhesion and the mismatch in tensile elongation between the foam and polyester fibers (~5% and ~50% respectively) led to rapid crack growth after the yield point at 2% strain. In contrast, the pre-treated glass and aramid fibers showed much larger increases in tensile strength and modulus. Aramid fibers, the lightest and strongest of the fibers used, resulted in the strongest composite foams.

As used herein and in the appended claims, the singular forms "a," "and," and "the" include plural references unless the context clearly dictates otherwise.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the typical methods, devices and materials are described below.

All publications mentioned herein are incorporated herein by reference in full for the purpose of describing and disclosing the methodologies and compositions of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. A foam composition comprising:
   a fibrous material and a plurality of microspheres, wherein the microspheres comprise heat-expanded microspheres, wherein the microspheres are interspersed within the fibrous material forming a part of the structure of the foam, and wherein the microspheres lack a separate binder phase.

2. A composition comprising:
   a microsphere component lacking a separate binder phase, wherein the microsphere component comprises a plurality of expandable microspheres comprising a thermoplastic material selected from the group consisting a polyvinyl alcohol, a polyvinyl chloride, a polypropylene, a polystyrene, a polyacrylonitrile, a polyimide, a polyamide, other thermoplastic polymers, and any combination thereof; and
   a fibrous component surrounding at least one of said microspheres.

3. The composition of claim 2, wherein the microsphere component comprises a combination of heat-expandable and non-expandable microspheres.

4. The composition of claim 2, wherein the microsphere is a polyacrylonitrile (PAN).

5. The composition of claim 4, wherein the PAN microspheres are a combination of expandable and non-expandable microspheres.

6. The composition of claim 2, wherein the microsphere is a polyvinyl chloride (PVC).

7. The composition of claim 2, wherein the fibrous component comprises aramid fibers, carbon fibers, glass fibers, or any combination thereof.

8. The composition of claim 2, wherein the composition comprises a fibrous component from about 2–15% by weight.

9. The composition of claim 8, wherein the fibrous component comprises about 10% by weight fiber.

10. The composition of claim 2, wherein the microsphere component comprises polyacrylonitrile (PAN) and the fiber component comprises polyester fibers, aramid fibers, glass fibers, or a combination thereof.

11. The composition of claim 2, wherein the microsphere component comprises polyvinyl chloride (PVC) and the fiber component comprises polyester fibers, aramid fibers, glass fibers, or a combination thereof.

12. A fibrous-reinforced foam made by a method comprising:
   contacting a fibrous material with a microsphere component under conditions such that the microsphere component infiltrates the fibers of the fibrous component to generate a mixture; and
   heating the mixture in a closed mold under conditions such that the microspheres expand to fill the closed mold such that a plurality of the microspheres are fused together, said microspheres lacking a separate binder phase.

13. The fibrous-reinforced foam of claim 12, wherein the mixture is expanded by applying a heat to the mold comprising the mixture.

14. The fibrous-reinforced foam of claim 12, wherein the conditions comprise vibrating the mixture.

15. The fibrous-reinforced foam of claim 12, wherein the microsphere component comprises a combination of expandable and non-expandable microspheres.

16. The fibrous-reinforced foam of claim 12, wherein the microsphere component comprises polyacrylonitrile (PAN) microspheres.

17. The fibrous-reinforced foam of claim 16, wherein the PAN microspheres are a combination of expandable and non-expandable microspheres.

18. The fibrous-reinforced foam of claim 12, wherein the microsphere component comprise polyvinyl chloride (PVC) microspheres.

19. The fibrous-reinforced foam of claim 12, wherein the fibrous component comprises aramid and/or glass fibers.

20. The fibrous-reinforced foam of claim 12, wherein the mixture comprises a fibrous component from about 2–15% by weight.

21. The fibrous-reinforced foam of claim 20, wherein the mixture comprises a fibrous component of about 10% by weight.

22. The fibrous-reinforced foam of claim 12, wherein the microsphere component comprises polyacrylonitrile (PAN) and the fiber component comprises polyester fibers, aramid fibers, glass fibers, or a combination thereof.

23. The fibrous-reinforced foam of claim 12, wherein the microsphere component comprises polyvinyl chloride (PVC) and the fiber component comprises polyester fibers, aramid fibers, glass fibers, or a combination thereof.

24. A method of making a fibrous-reinforced foam, comprising:
   mixing a microsphere component with a fiber component in a closed mold;
   vibrating the closed mold under conditions the cause the microspheres to infiltrate a fibrous matrix of the fiber component;
   heating the mold to expand the microspheres and fuse them together; and
   allowing the mixture to cool, said microspheres lacking a separate binder phase.

25. The composition of claim 2, wherein the ratio of unexpanded to expanded microspheres is 7:1.

26. The composition of claim 2, wherein the microsphere component further comprises a plurality of non-expandable microspheres selected from the group consisting of a glass, a silica-alumina ceramic, an epoxy resin, an unsaturated polyester resin, a silicone resin, a phenolic, and a amino resin.

27. The composition of claim 26, wherein the microsphere component comprises a combination of expanded and non-expanded microspheres.

28. A foam composition comprising:
   a fibrous material and a plurality of microspheres, wherein the microspheres comprise heat-expandable microspheres, wherein the microspheres are interspersed within the fibrous material forming a part of the structure of the foam, and wherein the foam lacks a separate binder phase.

29. A fibrous-reinforced foam made by a method consisting of:
   contacting a fibrous material with a microsphere component under conditions such that the microsphere component infiltrates the fibers of the fibrous component to generate a mixture; and
   heating the mixture in a closed mold under conditions such that the microspheres expand to fill the closed mold such that a plurality of the microspheres are fused together.

* * * * *